Aug. 17, 1965    K. W. KAMPERT    3,200,858
DEVICE FOR FILLING AND REMOVAL OF DRY BALLAST
Filed Dec. 18, 1961    2 Sheets-Sheet 1

Fig. 1

Inventor
Keith W. Kampert
Paul O. Pippel
Attorney

Aug. 17, 1965  K. W. KAMPERT  3,200,858
DEVICE FOR FILLING AND REMOVAL OF DRY BALLAST
Filed Dec. 18, 1961  2 Sheets-Sheet 2
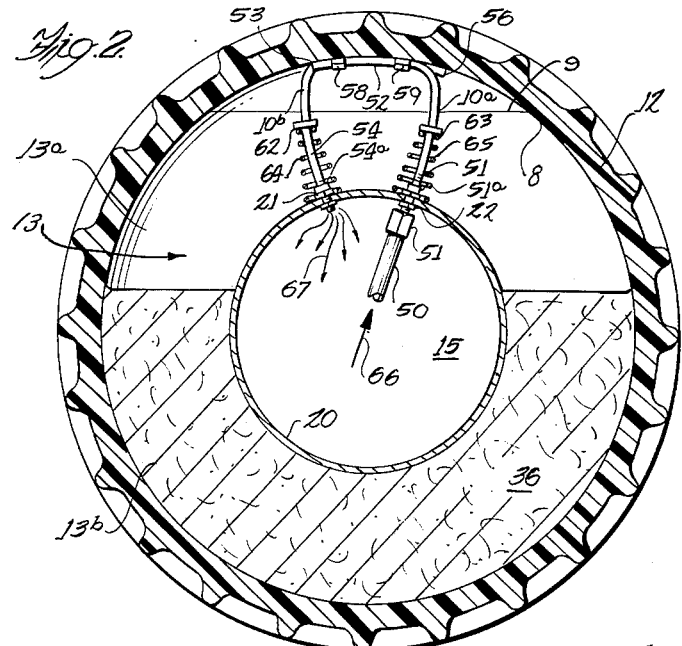
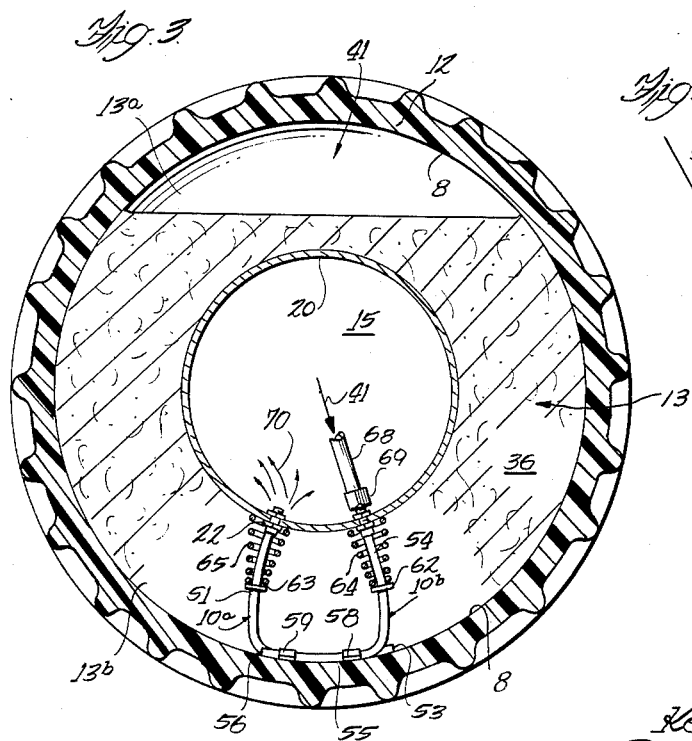
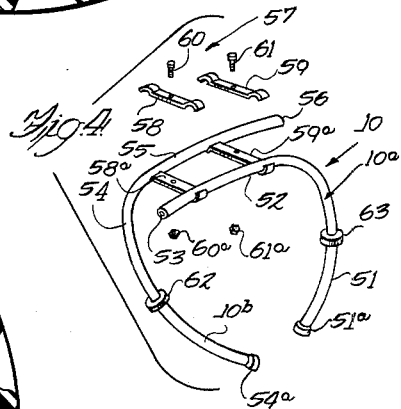
Inventor
Keith W. Kampert
Paul O. Pippel
Attorney 3,200,858
**DEVICE FOR FILLING AND REMOVAL OF
DRY BALLAST**
Keith W. Kampert, Libertyville, Ill., assignor to The
Frank G. Hough Co., a corporation of Illinois
Filed Dec. 18, 1961, Ser. No. 160,184
8 Claims. (Cl. 141—38)

This invention relates to a device for filling and removal of dry ballast and more particularly to a device for filling and removal of dry ballast from a pneumatic tire and for further regulating the pressure of inflated tire filled with ballast without removal thereof.

A problem in any prime mover which is required to pull heavy loads such as a wheel tractor has been to provide a device that will permit easy filling and removal of dry ballast from within the pneumatic tires. As the cross section of an inner sealed chamber increases in area, it becomes more difficult to entrain dry ballast in the suspension medium of a gaseous fluid such as air into the chamber for filling thereof and subsequently for removal thereof. If a device to assist filling and removal of dry ballast is mounted within the chamber having a large cross sectional area, it must be able to withstand shifting of the ballast during movement of the tire as well as flexure of the tire when subject to loads of the tractor such as tractor movement across an uneven path or a roadway. The device of the present invention provides permanent attachment to the rim so that it will remain within the sealed chamber of the attached pneumatic tire, and further provides easy filling and removal of a dry ballast suspended in a gaseous fluid. The inventive device can withstand flexure of the tire casing when under loads of the tractor as well as unevenness of the pathway where the tractor is being employed and also withstand shifting movements of the dry ballast within the casing during rotary movement of the tire about the tractor axle.

An object of the invention is to provide a device within a sealed chamber of a pneumatic tire that is of simple construction and that can be used for easy filling and removal of dry ballast.

Another object of the invention is to provide a device installed within the sealed chamber of a pneumatic tire casing to withstand flexure of the tire casing caused by loads from the tractor vehicle and the unevenness of pathway and further to withstand inertia movement of the dry ballast within the chamber.

A further object of the invention is to provide a device within the sealed chamber of a pneumatic tire assembly which can regulate the pressure of the tire without removal of any dry ballast in the chamber.

Other objects and features of the present invention will be apparent upon a perusal of the following specification and drawings of which:

FIGURE 1 is a front elevational view partially in cross section illustrating a device constructed according to the present invention as assembled in combination with the dry ballast reservoir and the tire assembly;

FIGURE 2 is a radial cross sectional view of the tire assembly with the device of the present invention in the position for filling the tire with dry ballast and for regulating the pressure of an inflated tire;

FIGURE 3 is another radial cross sectional view of the time assembly with the device of the present invention in the position for removal of dry ballast; and FIGURE 4 is a perspective view of the device constructed according to the present invention.

The present embodiment is the preferred embodiment but it is to be understood that changes can be made in the present embodiment by one skilled in the art without departing from the spirit and scope of the present invention.

Turning next to a detailed description of the present invention, continued reference is made to the drawings wherein like reference characters designate like or corresponding parts throughout the several views. In FIGURE 1 the device of the present invention is generally indicated by 10 in the sealed chamber 13 of the tire assembly indicated generally by number 11. Tire assembly 11 comprises a flexible outer casing 12 including substantially U-shaped inner circumferential wall 8 mounted on a rim 14 having a central opening 15 better shown in FIGURES 2 and 3. The bead of the tire casing, namely 12a and 12b provides the sealing action against circular rim portions 16 through 19 to assure a sealed chamber 13 defined by inner wall 8 and rim mid-portion 20 when the pneumatic tire assembly 11 is inflated to a predetermined pressure. The mid-portion 20 of the rim has attached thereto two spaced-apart fittings 21 and 22 which are of a general construction known in the art. These fittings 21 and 22 provide flow communication through the attached conduits 10a and 10b of the present invention between the sealed chamber 13 and the atmosphere or any attached conduit.

A pressure reservoir or hopper 23 is shown in FIGURE 1 for supplying dry ballast suspended in a pressurized gaseous fluid such as air to the sealed chamber of the tire to be filled. The hopper 23 comprises an outer cylindrical wall 24 mounted above ground level through three legs 25, 26 and 27 which are attached to the cylindrical wall 24 at the lower portion by such means as welding as shown in FIGURE 1. Also at the lower end of the cylindrical wall 24, an attached conical wall 28 extends down to an apex where a coupling member 29 is connected. An open upper chamber 33 is defined by an attached inner conical wall 31, an upper portion of outer cylindrical wall 24 and open upper end 30 where dry ballast 36 may be dumped by an operator. To maintain a pressurized chamber 34 between conical walls 28 and 31 and cylindrical wall 24, a pressure gate 35 is mounted within the apex opening 32 of the upper conical wall 31 that comprises an annular base support 37 supporting by means (not shown) a movable valve 38 with a conical portion 39 and an upwardly extending valve stem 40. The purpose of the valve stem 40 is to provide operator control for opening (as shown) and closing of the valve 38 against the annular support 37. The conical portion 39 assures free flow of the dry ballast 36 into the pressure chamber 34. Thus it can be readily seen with the pressure gate 35 in the open position as shown, dry ballast 36 flows freely along conical portion 39 of the valve 38 into the pressure chamber 34 from the open upper chamber 33. Then the operator closes the pressure gate 35 and the dry ballast 36 in the pressure chamber 34 is now ready to be pressurized by a gaseous suspension fluid.

It should now be pointed out that the dry ballast 36 can be any inert material of a particular size that can be easily fluffed or suspended by a pressurized gaseous fluid. Further the ballast 36 will not be affected by heat or cold, nor will its presence have any effect upon any material or equipment used in connection with the device of the present invention.

In FIGURE 1 pressurized gaseous fluid, in this instance air, is admitted from an intake valve 42 through a pressure regulator valve 43 having a pressure indicator 43a. The pressurized and regulated air flow is then passed through a T-connection 44 to flow control valves 45 and 46. Air flowing through flow control valve 45, conduit 46 and coupling 47 in the conical wall 28 is used to initially mix or suspend the dry ballast 36 within the pressure chamber 34 to a predetermined pressure which is checked by a pressure relief valve 72 with its pressure indicator 73. The mixing of the pressurized air and the dry ballast 36 within the pressure chamber 34 is known as fluffing. After entry of pressurized air into the pressure chamber 34 through flow control valve 45 the other flow control valve 46 is opened causing the flow of air first to conduit 48 then to conduit 50 through coupling 49a connected to the elbow connection 49 at one end. The elbow connection 49 is in turn connected at the other end to a coupling member 29 at the lower end of the conical wall 28 which communicates with the lower end of the pressure chamber 34. A flow of air from conduit 48 into conduit connection 49a results in a flow (indicated by arrow 66) of suspended dry ballast 36 in a suspension medium of pressurized air 41 through conduit 50 to its coupling member 50a attached to fitting 22 on the rim mid-portion 20.

Having shown in the foregoing discussion how a flow 66 of dry ballast suspended in pressurized air medium is accomplished through a controlled pressure reservoir, a detailed description will now be discussed of the removal and filling device of the subject invention within the sealed chamber of the tire casing 12. As shown in FIGURE 4 the filling and removing device 10 comprises a pair of conduits 10a and 10b each conduit having a first portion 51 and 54 including first end portions with coupling members 51a and 54a which are respectively connected to the fittings 21 and 22 as seen in the other figures. Conduits 10a and 10b have a second portion 52 and 55 which extend along the circumferential inner wall 8 of the tire casing 12 as shown in FIGURES 2 and 3 with openings 53 and 56 into the sealed chamber.

The conduits second portion 52 and 55 are clamped and held in a spaced-apart relationship at a predetermined distance by a securing assembly 57 which is shown in a disassembled relationship in FIGURE 4. The securing assembly consists of two pairs of upper clamping members 58 and 59 and lower clamping members 58a and 59a assembled together through the two fastening nuts and bolts 60, 60a, 61 and 61a that is readily apparent to those skilled in the art.

Although the conduits can be of any suitable flexible material, it has been found to assure maintaining uprightness of the conduit assembly during all loading action on the tire casing 12 and shifting movement of the ballast 36 within the sealed chamber 13 that an additional supporting means is necessaryy. Referring to FIGURES 2, 3 and 4 each conduit has a stop collar 62 and 63 which can be attached to each first portion 51 and 54 with any suitable means known in the art. As clearly seen in FIGURE 2 or 3 two coiled springs 64 and 65 which are narrower at one end than the other are mounted between the stop collars 62 and 63 and the rim mid-portion 20. Mounting these coiled springs 64 and 65 so that they extend about half way along the first portion 51 and 54 of the conduits from the rim mid-portion 20 would prevent any permanent damage to these springs 64 and 65 during operation from the flexure of the tire casing under load or movement of the dry ballast 36. Thus, the coil springs 64 and 65 afford a simple means to assure that the conduits 10a and 10b remain upright as shown in the drawings. Further it should be evident to those skilled in the art that other means in the art than the springs 64 and 65 could be employed to maintain the conduits 10a and 10b in an upright position.

In view of the foregoing discussion, the operation of the device 10 for filling and removal of dry ballast from the sealed chamber 13 of a pneumatic tire 12 will now be discussed below. In FIGURE 2 the filling of a tire with dry ballast 36 is shown wherein the device is in the upwardmost position of the tire 11. Conduit 50 permits entry of a flow comprising a pressurized mixture of suspended dry ballast and air shown by the arrow 66 and is released from opening 53 as shown in FIGURE 2 whereby the suspended ballast 36 within the released flow 66 naturally falls by its own weight into the sealed chamber 13 to form gradually the ballast pocket 13b in view of the chamber's lower pressure and larger volume.

For each tractor operation the predetermined amount or weight of dry ballast 36 in sealed chamber 13 is subject to change. Although the settled ballast 36 in FIGURE 2 is shown in ballast pocket 13b that is greater than half the capacity of sealed chamber 13, the settled ballast 36 could be increased to line 9 shown in phantom immediately below openings 53 and 56 in conduits 10a and 10b so that the settled ballast pocket would occupy greater than 90% capacity of the sealed chamber 13.

Although not heretofore mentioned in connection with the operation of the device, the other conduit 10b with opening 56 during filling of ballast by conduit 10a permits exit of a flow of air 67 from the chamber 13 at the fitting 21 to the atmosphere. The purpose of the other conduit 10b is to maintain a free circulation through the sealed chamber 13 so as to replace a predetermined volume of chamber air with a substantially equal volume of dry ballast 36.

After the tire has been filled with a predetermined amount of settled ballast in FIGURE 2, the tire in use on a moving vehicle sufficiently disturbs the settled ballast 36 to become evenly dispersed and suspended in the sealed chamber 13. A prior Patent Number 2,884,039 granted on April 28, 1959, to W. L. Hicks provides a disclosure of dry ballast being used in a sealed chamber of a pneumatic tire during conditions of filling with ballast, and further during even dispersal and suspension of ballast when the tire is used on a moving vehicle.

Normally the conditions of the earth vary greatly during the use of a ballasted tire so as to effect traction of a moving vehicle. In order to improve the traction of the vehicle when the earth conditions vary, the pressure of the inflated ballast-filled tire has to be varied without removal of ballast. The device of the subject invention having conduit section portions 52 and 55 being formed to contact a portion of the inner circumferential wall 8 of the outer casing 12 can be further operated to provide easy pressure regulation of the inflated tire casing 12 without removal or substantial removal of the ballast 36 during the use of the tire on a moving vehicle. Upon stopping the vehicle so that the device 10 of the subject invention is in an upward position as shown in FIGURE 2, the evenly dispersed and suspended ballast in the sealed chamber 13 from the prior action of the moving vehicle settles out sufficiently to provide an air pocket sufficiently below openings 53 and 56 of the conduits 10a and 10b. Employing a suitable air pressure regulating device known in the art and attached to one of fittings 21 and 22, pressurized air can be entered or removed through one of the conduit openings 53 and 56 in direct communication with the air pocket. Thus stopping the moving vehicle causes settlement of the evenly dispersed and suspended ballast into a settled ballast pocket such as ballast pocket 13b in FIGURE 2 and forms an air pocket 13a in the upper portion of the chamber; and the further operation of the invented device 10 positioned in the formed air pocket provides removal and entrance of a pressurized air flow without removal of settled ballast in the ballast pocket so that the pressure of the inflated tire 11 can readily be varied to meet changing earth conditions and thereby maintain sufficient traction of the moving vehicle.

In order to remove dry ballast 36 from the ballast pocket 13b the filling and removal device 10 must be positioned within the ballast pocket or downwardmost position of the tire 11 as shown in FIGURE 3. Here a flow of air 41 under pressure is admitted through a conduit 68 as shown in fragmentary portion that is coupled to fitting 21 through its coupling portion 69. The flow of pressurized air 41 causes a velocity at opening 56 sufficient to disturb the settled ballast 36 within ballast pocket 13b. The disturbed ballast 36 will then exit through opening 53 of conduit 10a and fitting 22 as shown as shown by direction arrows 70 as a flow of air and suspended ballast. Although not shown here another conduit can be attached to fitting 22 to prevent any loss of ballast removed from the tire 11 and stored in a closed container or another tire until needed.

From the foregoing, it will be seen that this invention is one well adapted to obtain all of the ends and objects hereinabove set forth together with other advantages which are obvious and which are adherent to the structure.

In view of the various modifications of the invention which will occur to those skilled in the art upon consideration of the foregoing disclosure without departing from the spirit or scope thereof, only such limitations should be imposed as are indicated by the appended claims.

This invention having been described, what is claimed is:

1. A device for filling a pneumatic tire with dry ballast, said tire consisting of a casing having a sealed chamber supported on a rim, said device comprising an intake fitting and an exhaust fitting mounted on said rim in closely spaced apart relationship and providing communication to said sealed chamber, an intake conduit and an exhaust conduit each of said conduits having first end portions respectively connected to said fittings and extending from the fittings into the sealed chamber in a substantially radial direction, said intake and exhaust conduits including second portions having openings, said second portions extending substantially circumferentially from said first portions and with said openings facing in opposite directions, and securing means to clamp and hold said second portions adjacent said casing opposite said rim, and means for injecting a flow of air in which ballast is entrained through the opening in the intake conduit so that said flow will be directed away from said opening in the exhaust conduit and said air will enter said exhaust opening only after decreasing in velocity and allowing said ballast to settle out thereby filling the tire with ballast.

2. A device for filling a pneumatic tire with a ballast, said tire having a casing with a sealed chamber supported on a rim, said chamber when at rest consisting of an air pocket and a ballast pocket, said device comprising an intake fitting and an exhaust fitting mounted on said rim in spaced apart relationship and providing communication to said air pocket, an intake conduit and an exhaust conduit each having first end portions respectively connected to said fittings, said intake and exhaust conduits extending from said fittings into said air pocket in a substantially radial direction, a stop means mounted on said conduits, resilient supporting means mounted between said stop means and said rim to maintain said conduits in the outward direction, each of said intake and exhaust conduits including second end portions having openings and positioned adjacent said casing opposite said rim, said openings facing in opposite directions, and means for injecting a flow of air and ballast through the intake conduit so that said flow will be directed away from said opening in said exhaust conduit until the velocity thereof decreases allowing the ballast to separate and fill the tire.

3. A device for removing ballast from a pneumatic tire having a casing with a sealed chamber mounted on a rim, said chamber when at rest including an air pocket and a ballast pocket with the air pocket of lesser volume and above the ballast pocket, said device comprising an intake fitting and an exhaust fitting mounted on said rim in a spaced apart relationship and providing communication to said ballast pocket, an intake conduit and an exhaust conduit each with first portions respectively connected to said fittings and extending from the fittings into the ballast pocket in a substantially radial direction, each of said intake and exhaust conduits including second portions having openings and extending circumferentially from said first portions with said openings facing in opposite direction, and securing means to clamp and hold said second portions in a spaced apart relationship adjacent said casing and opposite said rim and means for injecting a flow of air through the intake conduit so that said air will entrain said ballast and remove the same through the exhaust conduit to decrease the weight of the tire.

4. A device for removing ballast from a pneumatic tire, having a casing with a sealed chamber supported on a rim, said chamber when at rest consisting of an air pocket and a ballast pocket, said device comprising an intake fitting and an exhaust fitting mounted on said rim in spaced apart relationship and providing communication to said ballast pocket of the chamber, a flexible intake conduit and a flexible exhaust conduit respectively connected to said fittings, said intake and exhaust conduits extending from the fittings to a point opposite said rim and adjacent said casing and including openings communicating with the ballast pocket of the chamber, said openings facing in different directions, and resilient support means interposed between said rim and said conduits and means for injecting a flow of air through the intake conduit so that said air removes the ballast from the ballast pocket of the chamber through the exhaust conduit due to entrainment of the ballast in the air.

5. A device for removing ballast from a pneumatic tire, having a casing with a sealed chamber supported on a rim, said chamber when at rest including an air pocket and a ballast pocket, said device comprising an intake fitting and an exhaust fitting mounted on said rim in spaced apart relationship and providing communication to said ballast pocket, a flexible intake conduit and a flexible exhaust conduit each having first portions respectively connected to said fittings and extending from the fittings into the ballast pocket in a substantially radial direction, a stop means mounted on said first portion of said conduits, a resilient supporting means mounted between said stop means and said rim to maintain said conduits in the radial direction, each of said intake and exhaust conduits including second portions having openings, said second portions extending substantially circumferentially from said first portions and with said openings facing in opposite directions, securing means to clamp and hold said second portions together to provide rigidity to said flexible conduits, and means for injecting a flow of air through the intake conduit so that said air will entrain said ballast and remove the same along with the air through the exhaust conduit thereby decreasing the weight of the tire.

6. A device for removing ballast from a pneumatic tire, having a casing with a sealed chamber supported on a rim, said chamber when at rest consisting of an air pocket and a ballast pocket, said device comprising an intake fitting and an exhaust fitting mounted on said rim in spaced apart relationship and providing communication to said ballast pocket, an intake conduit and an exhaust conduit each having first end portions respectively connected to said fittings, said intake and exhaust conduits extending from the fittings into the ballast pocket in a radial direction, a stop means mounted on said conduits, a supporting means mounted between said stop means and said rim to maintain said conduits in the radial direction, said intake and exhaust conduits including second end portions positioned adjacent said casing opposite said rim and having openings, said openings facing in opposite directions, and means for injecting a flow of air through the intake conduit so that said air will entrain said ballast and expel the same through the exhaust conduit thereby removing ballast from the ballast pocket to decrease the weight of the tire.

7. A device for filling a pneumatic tire with a dry ballast, said tire having a casing supported on a rim and forming therewith an enclosed chamber, said device comprising an intake fitting and an outlet fitting mounted on said rim in closely spaced apart relationship, an intake and an outlet conduit each being flexible and having a first portion and a second portion, the first portion of said intake and outlet conduits being connected to said intake and outlet fittings respectively and extending substantially radially into said chamber, said second portions of said conduits being fastened together and positioned adjacent said casing and opposite said rim and extending substantially parallel to each other in opposite directions.

8. A device for filling a pneumatic tire with a dry ballast, said tire having a casing supported on a rim and forming therewith an enclosed chamber, said device comprising an intake fitting and an outlet fitting mounted on said rim in closely spaced apart relationship, a flexible intake conduit, a flexible outlet conduit, each of said conduits having a first portion and a second portion, said first portions being attached respectively to the corresponding fitting and extending substantially radially into said chamber, said second portion extending substantially circumferentially of said casing in close proximity to the outer periphery thereof and toward the other of said first portions, said second portions being substantially parallel to each other and having openings facing in opposite directions, clamp means for fastening said second portions together for increasing the rigidity of said flexible conduits and resilient support means engaging said conduits and said rim for resisting the forces imparted thereto by the ballast as said tire is rotated.

References Cited by the Examiner
UNITED STATES PATENTS 2,581,914  1/52  Darrow _____ 152—330 XR

FOREIGN PATENTS 554,046  3/58  Canada.

LAVERNE D. GEIGER, *Primary Examiner.*

LOUIS J. DEMBO, *Examiner.*